(12) United States Patent
Nakayama et al.

(10) Patent No.: US 6,590,550 B2
(45) Date of Patent: Jul. 8, 2003

(54) LIQUID CRYSTAL DISPLAY DEVICE HAVING STABILIZED PIXEL ELECTRODE POTENTIALS

(75) Inventors: Takanori Nakayama, Mobara (JP); Masuyuki Oota, Kariya (JP); Keiichirou Ashizawa, Mobara (JP); Masahiro Ishii, Mobara (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 09/773,662

(22) Filed: Feb. 7, 2001

(65) Prior Publication Data

US 2001/0019322 A1 Sep. 6, 2001

(30) Foreign Application Priority Data

Mar. 2, 2000 (JP) .......................................... 2000-056933

(51) Int. Cl.[7] .................................................. G09G 3/36
(52) U.S. Cl. .............................. 345/87; 345/96; 349/139
(58) Field of Search ...................... 345/87–100; 349/33, 349/34, 37–39, 109, 147, 157, 139–142

(56) References Cited

U.S. PATENT DOCUMENTS

| 5,402,141 A | * | 3/1995 | Haim et al. .................... 345/88 |
| 5,659,375 A | * | 8/1997 | Yamashita et al. ............. 349/38 |
| 5,745,207 A | * | 4/1998 | Asada et al. .................. 349/141 |
| 5,757,444 A | | 5/1998 | Takemura |
| 5,852,488 A | | 12/1998 | Takemura |

FOREIGN PATENT DOCUMENTS

| JP | 05-080354 | 9/1991 |
| JP | 07-114045 | 10/1993 |

OTHER PUBLICATIONS

S.H. Lee, S.L. Lee, H.Y. Kim and T. Y. Eom, Late–News Paper: A Novel Wide–Viewing–Angle Technology: Ultra–Trans View, SID 99 Digest, pp. 202–205.

* cited by examiner

Primary Examiner—Richard Hjerpe
Assistant Examiner—Alexander Eisen

(57) ABSTRACT

A liquid crystal display device includes a pair of opposing substrates, a liquid crystal layer sandwiched between the substrates, plural pixels each having a switching element and disposed in an area surrounded by first and second gate signal lines and drain signal lines. Each video information supplied for each pixel from a corresponding one of the drain signal lines is written thereinto via the switching element driven by a first scanning signal from the first gate signal line. A second scanning signal from the second gate signal line rises approximately simultaneously with fall of the first scanning signal such that disturbances introduced into one of the pixels by the first scanning signal and the second scanning signal cancel each other.

11 Claims, 12 Drawing Sheets

LIQUID CRYSTAL DISPLAY DEVICE HAVING STABILIZED PIXEL ELECTRODE POTENTIALS

BACKGROUND OF THE INVENTION

The present invention relates to a liquid crystal display device, and in particular to an active matrix type liquid crystal display device.

Among the active matrix type liquid crystal display devices, a so-called in-plane switching type (or a so-called horizontal electric field type) liquid crystal display device, for example, has a pair of opposing transparent substrates, a liquid crystal layer sandwiched between the substrates, and a plurality of pixel areas formed on a surface of one of the substrates on a liquid crystal layer side thereof each having a pixel electrode and a counter electrode configured so as to generate therebetween electric fields having components parallel with the major surfaces of the substrates.

While the counter electrode is supplied with a voltage signal serving as a reference voltage, the pixel electrode is supplied with a video signal from a drain signal line via a thin film transistor driven by a scanning signal from a gate signal line.

In each pixel area, a holding capacitance Cstg is formed between the counter electrode and the pixel electrode such that the video signal is stored in the pixel electrode after the thin film transistor is turned OFF.

For example, each pixel area is disposed in an area surrounded by two adjacent ones of a plurality of gate signal lines (or a plurality of counter-voltage signal lines) each extending in the x-axis direction and arranged in the y-axis direction in a system of rectangular co-ordinates and two adjacent ones of a plurality of drain signal lines each extending in the y-axis direction and arranged in the x-axis direction.

In the liquid crystal display device having such a configuration, however, when writing of a signal into a pixel electrode is completed via a thin film transistor, a potential of a source side of the thin film transistor connected to the pixel electrode is shifted toward a lower potential due to a capacitive coupling by a capacitance Cgs between the source and a gate of the thin film transistor. Noise which causes such an unwanted shift of a potential or a voltage will be hereinafter referred to as a disturbance voltage.

A potential of the counter electrode is also shifted toward a lower potential due to a capacitive coupling by a capacitance Cgc between a gate signal line connected to the gate of the thin film transistor and the counter electrode (or a counter-voltage signal line), and therefore, if a delay time constant of the counter-voltage signal is large, the potential of the counter electrode is shifted toward a lower potential and varies the potential of the source via the holding capacitance Cstg.

If a distortion occurs in a scanning signal (pulse) due to a delay caused by resistance, capacitance and the like of the gate signal line, the thin film transistor is brought into a half-ON state when selection of the gate is completed, therefore a disturbance voltage is superimposed upon a useful signal, as a result, an apparent magnitude of the disturbance voltage is made smaller and the potential of the source side of the thin film transistor is shifted toward a higher potential after the writing of the signal is completed.

Therefore the amount of a shift of the potential varies according to the amount of the delay by the gate signal lines, and consequently, the brightness of the display area becomes non-uniform (graded).

The optimum potential of the counter electrode varies with position in the display area and this variation causes flicker, image retention and the like.

Further, the potential of the counter electrode is shifted toward a lower potential according to the amount of the delay caused by resistance, capacitance and the like of the counter-voltage signal line when selection of the gate is completed, as a result the potential of the source side of the thin film transistor becomes instable and this instability causes a graded brightness distribution, flicker, smears, image retention, and the like.

SUMMARY OF THE INVENTION

This invention was made based upon the above situation, and it is an object of the present invention to provide a liquid crystal display device having stabilized pixel electrode potentials irrespective of the amount of signal delays in the gate signal lines and the like.

The following explains representative ones of the inventions disclosed in this specification briefly.

In accordance with an embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixels each having a switching element and disposed in an area surrounded by two adjacent ones of the plurality of gate signal lines and two adjacent ones of the plurality of drain signal lines, each of the plurality of pixels being configured such that video information supplied from a corresponding one of the plurality of drain signal lines is written thereinto via the switching element driven by a first scanning signal from a corresponding one of the plurality of gate signal lines, wherein a second scanning signal from one of the plurality of gate signal lines succeeding the corresponding one of the plurality of gate signal lines rises approximately simultaneously with fall of the first scanning signal such that disturbances introduced into one of the plurality of pixels by the first scanning signal and the second scanning signal cancel each other.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode and a switching element, and surrounded by two adjacent ones of the plurality of gate signal lines and two adjacent ones of the plurality of drain signal lines, the pixel electrode being supplied with a video signal from a corresponding one of the plurality of drain signal lines via the switching element driven by a scanning signal supplied from a corresponding one of the plurality of gate signal lines, wherein a capacitance formed between the pixel electrode and the corresponding one of the plurality of gate signal lines is approximately equal to a capacitance formed between the pixel electrode and one of the plurality of gate signal lines succeeding the corresponding one of the plurality of gate signal lines.

In accordance with another embodiment of the present invention, there is provided a liquid crystal display device comprising: a pair of opposing first and second substrates; a liquid crystal layer sandwiched between the pair of opposing first and second substrates; a plurality of gate signal lines disposed on a surface of the first substrate on a liquid crystal layer side thereof; a plurality of drain signal lines disposed to intersect the plurality of gate signal lines with an insulating layer interposed therebetween on the surface of the first substrate; and a plurality of pixel areas each having a pixel electrode and a switching element, and arranged in a matrix fashion surrounded by two adjacent ones of the plurality of gate signal lines and two adjacent ones of the plurality of drain signal lines, the pixel electrode being supplied with a video signal from a corresponding one of the plurality of drain signal lines via the switching element driven by a scanning signal supplied from a corresponding one of the plurality of gate signal lines, wherein a following inequality is satisfied:

$$(\tfrac{1}{2})Cgs\text{-}s \leq Cgs\text{-}n \leq 2Cgs\text{-}s,$$

where Cgs–s is a capacitance between the pixel electrode and the corresponding one of the plurality of gate signal lines, and Cgs–n is a capacitance between the pixel electrode and one of the plurality of gate signal lines succeeding the corresponding one of the plurality of gate signal lines.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode, a counter electrode adjacent to the pixel electrode and a switching element, and surrounded by two adjacent ones of the plurality of gate signal lines and two adjacent ones of the plurality of drain signal lines, the pixel electrode and the counter electrode being arranged so as to generate therebetween an electric field having a component parallel to the surface of the one of the pair of opposing substrates, the pixel electrode being supplied with a video signal from a corresponding one of the plurality of drain signal lines via the switching element driven by a scanning signal supplied from a corresponding one of the plurality of gate signal lines, wherein a capacitance formed between the pixel electrode and the corresponding one of the plurality of gate signal lines is approximately equal to a capacitance formed between the pixel electrode and one of the plurality of gate signal lines succeeding the corresponding one of the plurality of gate signal lines, and a capacitance formed between the counter electrode and the corresponding one of the plurality of gate signal lines is approximately equal to a capacitance formed between the counter electrode and one of the plurality of gate signal lines succeeding the corresponding one of the plurality of gate signal lines.

In accordance with another embodiment of the present invention, there is provided a liquid crystal display device comprising: a pair of opposing first and second substrates; a liquid crystal layer sandwiched between the pair of opposing first and second substrates; a plurality of gate signal lines disposed on a liquid crystal layer side surface of the first substrate; a plurality of drain signal lines disposed to intersect the plurality of gate signal lines with an insulating layer interposed therebetween; and a plurality of pixel areas each having a pixel electrode, a counter electrode adjacent to the pixel electrode and a switching element, and arranged in a matrix fashion surrounded by two adjacent ones of the plurality of gate signal lines and two adjacent ones of the plurality of drain signal lines, the pixel electrode being supplied with a video signal from a corresponding one of the plurality of drain signal lines via the switching element driven by a scanning signal supplied from a corresponding one of the plurality of gate signal lines, the pixel electrode and the counter electrode being arranged so as to generate therebetween an electric field having a component parallel to the surface of the first substrate, wherein following inequalities are satisfied:

$$(\tfrac{1}{2})Cgs\text{-}s \leq Cgs\text{-}n \leq 2Cgs\text{-}s,$$

and $$(\tfrac{1}{2})Cgc\text{-}s \leq Cgc\text{-}n \leq 2Cgc\text{-}s,$$

where Cgs–s is a capacitance formed between the pixel electrode and the corresponding one of the plurality of gate signal lines, Cgs–n is a capacitance formed between the pixel electrode and one of the plurality of gate signal lines succeeding the corresponding one of the plurality of gate signal lines, Cgc–s is a capacitance formed between the counter electrode and the corresponding one of the plurality of gate signal lines, and Cgc–n is a capacitance formed between the counter electrode and one of the plurality of gate signal lines succeeding the corresponding one of the plurality of gate signal lines.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode and a switching element, and surrounded by two adjacent ones of the plurality of gate signal lines and two adjacent ones of the plurality of drain signal lines, the pixel electrode being configured so as to hold a video signal written thereinto from a corresponding one of the plurality of drain signal lines via the switching element driven by a scanning signal supplied from a corresponding one of the plurality of gate signal lines, wherein a following inequality is satisfied:

$$|Vhb| \leq |Vha|,$$

where Vw is a voltage for writing the video signal into the pixel electrode when the scanning signal is applied to the corresponding one of the plurality of gate signal lines, Vh1 is a hold voltage held on the pixel electrode when a second scanning signal is applied to one of the plurality of gate signal lines succeeding the corresponding one of the plurality of gate signal lines, Vh2 is a hold voltage held on the pixel electrode after an end of the second scanning signal, |Vhb| is an absolute difference between Vw and Vh1, and |Vha| is an absolute difference between Vw and Vh2.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates;

a plurality of drain signal lines disposed to intersect the plurality of gate signal lines with an insulating layer interposed therebetween; and a plurality of pixel areas each having a pixel electrode and a thin film transistor, and surrounded by two adjacent ones of the plurality of gate signal lines and two adjacent ones of the plurality of drain signal lines, the pixel electrode being supplied with a voltage Vs of a source electrode of the thin film transistor receiving the drain electrode voltage Vd from a corresponding one of the plurality of drain signal lines, the thin film transistor being driven by rise of a signal supplied from a corresponding one of the plurality of gate signal lines, wherein Vso is in a range of Vd±Vds, where Vso=a voltage of the source electrode during a rising period of a second signal on one of the plurality of gate signal lines succeeding the corresponding one of gate signal lines, and Vds=a difference between the drain electrode voltage Vd and a voltage Vs1 of the source electrode after the second signal is turned off.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode and a switching element, and surrounded by two adjacent ones of the plurality of gate signal lines and two adjacent ones of the plurality of drain signal lines, the pixel electrode being supplied with a signal from a corresponding one of the plurality of drain signal lines via the switching element to be turned ON by a signal supplied from a corresponding one of the plurality of gate signal lines, wherein a following inequality is satisfied: Variation 1<Variation 2, where Variation 1=a difference between a voltage supplied to the pixel electrode when the switching element is ON and a voltage on the pixel electrode when a second signal is supplied to one of the plurality of gate signal lines succeeding the corresponding one of the plurality of gate signal lines, and Variation 2=a difference between the voltage supplied to the electrode when the switching element is ON and a voltage on the pixel electrode after an end of the second signal.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode, a counter electrode adjacent to the pixel electrode and a switching element, and surrounded by two adjacent ones of the plurality of gate signal lines and two adjacent ones of the plurality of of drain signal lines, the pixel electrode and the counter electrode being arranged so as to generate therebetween an electric field having a component parallel to the surface of the one of the pair of opposing substrates, the pixel electrode being supplied with a video signal from a corresponding one of the plurality of drain signal lines via the switching element driven by a scanning signal supplied from a corresponding one of the plurality of gate signal lines, and an insulating layer is interposed between the at least one of the pixel electrodes and the one of the plurality of gate signal lines at the portion, and the pair of first and second counter-voltage signal lines are connected to end of the counter electrode wherein the first counter-voltage signal line and the pixel electrode form a first holding capacitance Cstg1 therebetween, the second counter-voltage signal line and the pixel electrode form a second holding capacitance Cstg2 therebetween, and the pixel electrode and the second one of the plurality of gate signal lines form a capacitance Cadd therebetween, and wherein following inequalities are satisfied:

$$(½)Cgs-s \leq Cgs-n \leq 2CGS-s,$$

Cadd<Cstg1, and Cadd<Cstg2, where Cgs-s is a capacitance between the pixel electrode and the corresponding one of the plurality of gate signal lines, and Cgs-n is a capacitance between the pixel electrode and the second one of the plurality of gate signal lines, respectively.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixel areas each having a pixel electrode, a counter electrode adjacent to the pixel electrode and a switching element, and surrounded by two adjacent ones of the plurality of gate signal lines and two adjacent ones of the plurality of drain signal lines, the pixel electrode and the counter electrode being arranged so as to generate therebetween an electric field having a component parallel to the surface of the one of the pair of opposing substrates, the pixel electrode being supplied with a video signal from a corresponding one of the plurality of drain signal lines via the switching element driven by a scanning signal supplied from a corresponding one of the plurality of gate signal lines, wherein at least one of the pixel electrodes has a portion overlying one of the plurality of gate signal lines succeeding the corresponding one of the plurality of gate signal lines, and an insulating layer is interposed between the at least one of the pixel electrodes and the one of the plurality of gate signal lines at the portion, and each of the pixel electrode and the counter electrode has one bend or an odd number of bends more than one.

In accordance with another embodiment of the present invention, there is provided a liquid crystal display device comprising: a pair of opposing substrates; a liquid crystal layer sandwiched between the pair of opposing substrates; a plurality of gate signal lines disposed on a liquid crystal layer side surface of one of the pair of opposing substrates; a plurality of drain signal lines disposed to intersect the plurality of gate signal lines with an insulating layer interposed therebetween; and a plurality of pixels each having a pixel electrode, a counter electrode adjacent to the pixel electrode and a switching element, and surrounded by two adjacent ones of the plurality of gate signal lines and two adjacent ones of the plurality of drain signal lines, the pixel electrode and the counter electrode being arranged so as to generate therebetween an electric field having a component parallel to the surface of the one of the pair of opposing substrates, the pixel electrode being supplied with a video signal from a corresponding one of the plurality of drain signal lines via the switching element driven by a scanning signal supplied from a corresponding one of the plurality of gate signal lines, wherein each of the pixel electrode and the counter electrode has a bend, each of the plurality of drain signal lines has a bend within each of the plurality of pixels, and at least one of the pixel electrodes has a portion overlying one of the plurality of gate signal lines succeeding the corresponding one of the plurality of gate signal lines, and an insulating layer is interposed between the at least one of the pixel electrodes and the one of the plurality of gate signal lines at the portion.

In accordance with another embodiment of the present invention, there is provided a liquid crystal display device comprising: a pair of opposing substrates; a liquid crystal layer sandwiched between the pair of opposing substrates; a plurality of scanning signal lines disposed on a liquid crystal layer side surface of one of the pair of opposing substrates; a plurality of video signal lines disposed to intersect the plurality of scanning signal lines with an insulating layer interposed therebetween; and a plurality of pixel areas each having a pixel electrode and a thin film transistor, and surrounded by two adjacent ones of the plurality of scanning signal lines and two adjacent ones of the plurality of video signal lines, a source electrode of the thin film transistor being connected to the pixel electrode, a drain electrode of the thin film transistor being connected to a corresponding one of the plurality of video signal lines, a gate electrode of the thin film transistor being connected to a corresponding one of the plurality of scanning signal lines, wherein a following inequality is satisfied:

(½) Area $A$ < Area $C$ < 2 Area $A$, where the Area A is an area of a region A of the corresponding one of the plurality of scanning signal lines being overlaid with the source electrode, the Area B is an area of a region B of the corresponding one of the plurality of scanning signal lines being overlaid with the drain electrode, and the Area C is an area of a region C of the corresponding one of the plurality of scanning signal lines being overlaid with a pixel electrode corresponding to one of the plurality of scanning signal lines preceding the corresponding one of the plurality of scanning signal lines, the region A, the region B and the region C being spaced from one another.

In a liquid crystal display device having the above configuration, video signals from the drain signal lines are written into pixel electrodes via switching elements corresponding to one gate signal line, and immediately after writing of the video signals is completed, simultaneously with fall of a scanning signal applied to the one gate signal line, a scanning signal applied to another gate signal line succeeding the one gate signal line rises and disturbance voltages introduced into the pixels by the two scanning signals cancel each other.

As a result, the potentials of the pixel electrodes are stabilized irrespective of the amount of signal delays in the gate signal lines and the like.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

The embodiments of a liquid crystal display device in accordance with the present invention will be explained by reference to the drawings.

Embodiment 1

Equivalent Circuit of the Overall Structure of a Liquid Crystal Display Device

Figure 2:
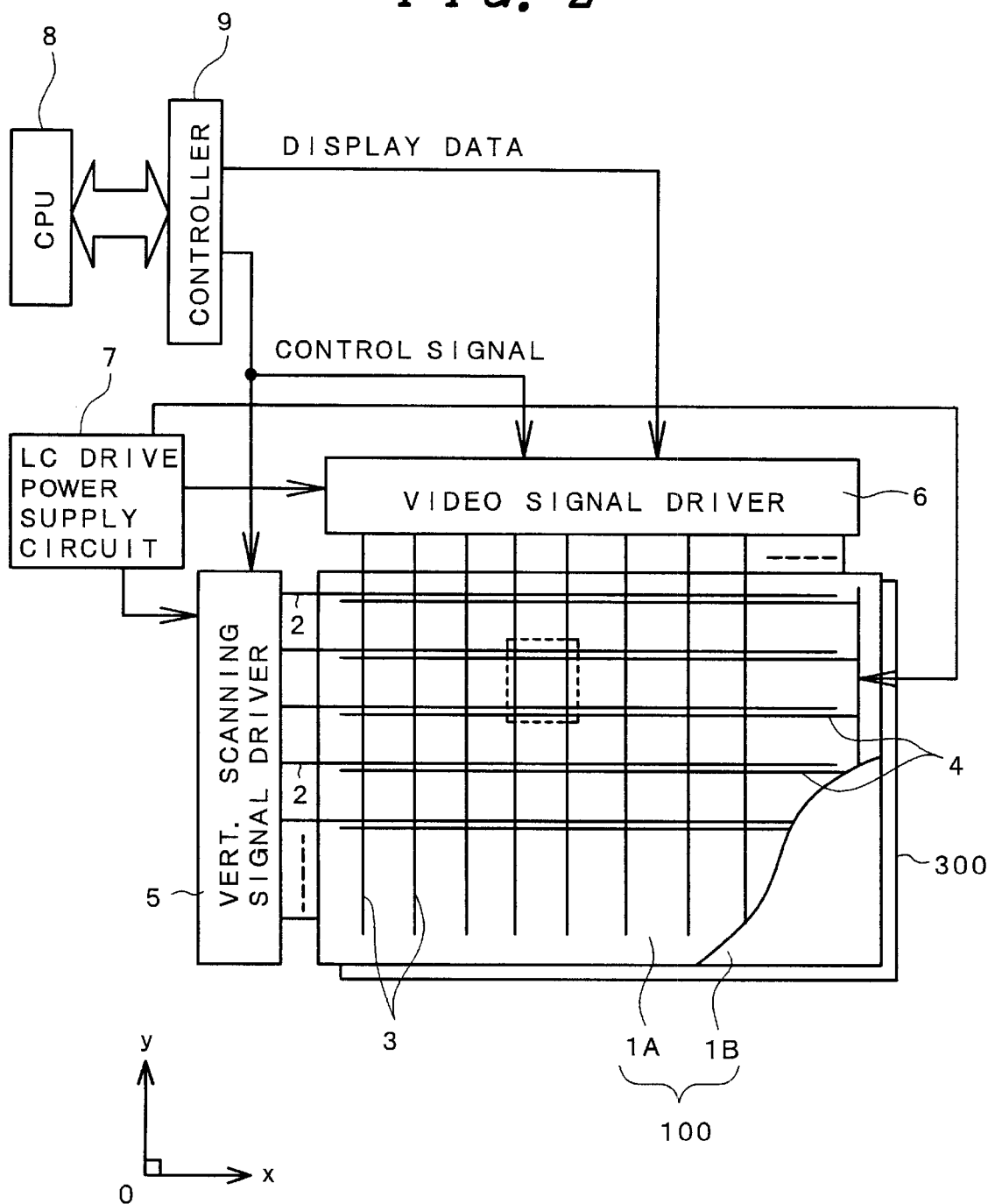
FIG. 2 is an equivalent circuit diagram of an overall structure of an embodiment of a liquid crystal display device in accordance with the present invention.

In FIG. 2, reference numeral 100 denotes an active matrix type liquid crystal display panel. A display area of the liquid crystal display panel 100 is comprised of a plurality of pixels arranged in a matrix fashion. Each pixel is configured such that it can modulate transmission therethrough of light from a backlight unit 300 disposed behind the liquid crystal display panel 100.

The light modulation at each pixel is performed by using a method of the in-plane switching type (the so-called horizontal electric field type), and as described in detail subsequently, electric fields generated in a liquid crystal layer interposed between a pair of opposing transparent substrates are made parallel with the major surfaces of the transparent substrates.

Greater detail of the in-plane switching type is contained in U.S. Pat. No. 5,598,285 issued on Jan. 28, 1997 and U.S. Pat. No. 5,737,051 issued on Apr. 7, 1998. These two patents are incorporated by reference herein for the purpose of disclosure.

Such liquid crystal display panel 100 provides a sharp video image display even when the display is viewed at a large angle from the normal to the display area, and therefore it is known that it is superior in wide-angle viewing.

In the liquid crystal display panel 100, a pair of opposing transparent substrates 1A and 1B sandwich a liquid crystal layer therebetween, and there are plural gate signal lines 2 and plural counter-voltage signal lines 4 each extending in the x-axis direction (the row direction) and arranged in the y-axis direction (the column direction) in a system of rectangular co-ordinates on a surface of the transparent substrate 1A on a liquid crystal layer side thereof.

In FIG. 2, a gate signal line 2, a counter-voltage signal line 4, a gate signal line 2, a counter-voltage signal line 4, . . . are arranged at approximately equal intervals sequentially from the top of the transparent substrate 1A.

A plurality of drain signal lines 3 insulated from the gate signal lines 2 and the counter-voltage signal lines 4 are formed to extend in the y-axis direction and be arranged in the x-axis direction.

A unit pixel is formed in a rectangular area surrounded by two adjacent ones of the gate signal lines 2 and two adjacent ones of the drain signal lines 3, and a plurality of unit pixels are arranged in a matrix fashion to form a display area. A detail of the pixel will be explained subsequently.

The liquid crystal display panel 100 is provided with a vertical scanning signal driver 5 and a video signal driver 6 external to the liquid crystal display panel 100, the vertical scanning signal driver 5 supplies scanning signals (volts) to respective ones of the gate signal lines 2 sequentially, and the video signal driver 6 supplies video signals (volts) to respective ones of the drain signal lines 3 in synchronism with the scanning signals.

The vertical scanning signal driver 5 and the video signal driver 6 are supplied with supply voltages from a liquid crystal driving power supply circuit 7, and supplied with video information from CPU 8 after the video information has been separated into display data and control data by a controller 9.

The liquid crystal driving power supply circuit 7 also supplies a counter-voltage signal (volts) to the counter-voltage signal line provided in the liquid crystal display panel 100, and this counter-voltage signal serves as a reference voltage for video signals, and can be a direct-current voltage or an alternating voltage.

Configuration of Pixels

Figure 3:
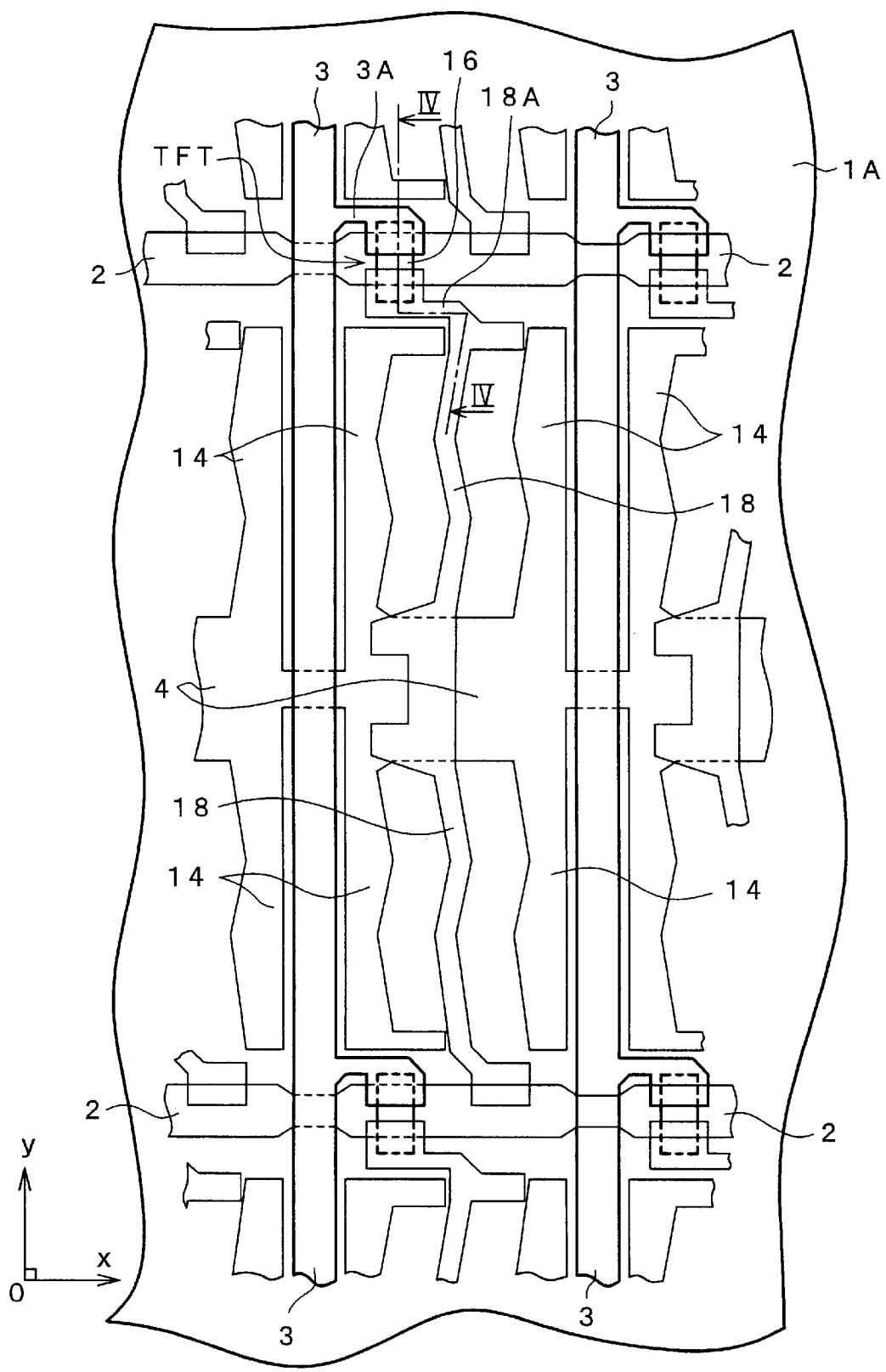
FIG. 3 is a plan view of a pixel in an embodiment of a liquid crystal display device in accordance with the present invention.
Figure 4:
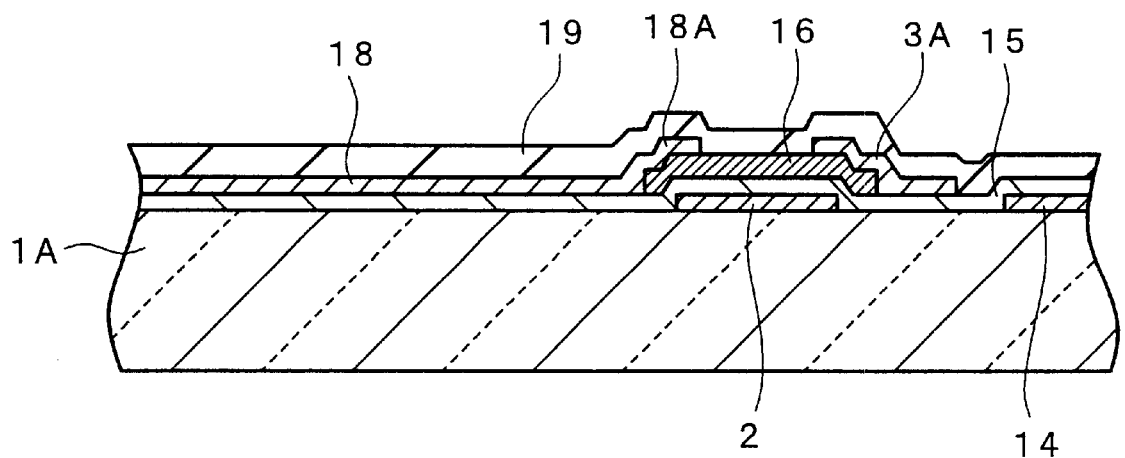
FIG. 4 is a cross-sectional view of the pixel taken along line IV—IV of FIG. 3.

FIG. 3 is a plan view of an example of a unit pixel (which corresponds to an area enclosed by broken lines in FIG. 2), and FIG. 4 is a cross-sectional view of the unit pixel taken along line IV—IV of FIG. 3.

In FIG. 3, the gate signal lines 2 extending in the x-axis direction are disposed at the top and the bottom of the pixel area on a surface of the transparent substrate 1A on a liquid crystal layer side thereof.

In FIG. 3, the gate signal line 2 at the top serves as a gate signal line 2 associated with the pixel area in point (hereinafter referred to as the gate signal line 2 in point), and the gate signal line 2 at the bottom serves as a gate signal line 2 succeeding the gate signal line 2 in point (hereinafter referred to as the succeeding gate signal line 2).

With this configuration, a pixel electrode 18 (which will be explained subsequently) in the pixel area formed between the gate signal line 2 in point and the succeeding gate signal line 2 is supplied with a video signal from the drain signal line 3 via a thin film transistor TFT (which will be explained subsequently) driven by a scanning signal from the gate signal line 2 in point.

The counter-voltage signal line 4 extending in the x-axis direction is formed approximately midway between the gate signal line 2 in point and the succeeding gate signal line 2.

A counter electrode 14 is formed integrally with the counter-voltage signal line 4, and the counter-voltage electrodes 14 are formed to extend along the respective drain signal lines 3 (which will be explained subsequently), for example, in the y-axis direction of FIG. 3.

In other words, the two counter electrodes 14 are formed one on each side within the pixel area and are connected to the counter-voltage signal line 4 at the midpoints thereof.

In this embodiment, the number of the counter electrodes 14 within one pixel area is two, but it may be increased to 3, 4 or more.

An insulating film 15 (see FIG. 4, not shown in FIG. 3) made of silicon nitride, for example, is formed on the surface of the transparent substrate 1A having thereon the gate signal lines 2, the counter-voltage signal lines 4 and the counter electrodes 14 such that the gate signal lines 2, the counter-voltage signal lines 4 and the counter electrodes 14 are also covered with the insulating film 15.

The insulating film 15 serves as an interlayer insulating film for the drain signal lines 3 at intersections of the drain signal lines 3 with the gate signal lines 2 and the counter-voltage signal lines 4, as a gate insulating film in an area formed with the thin film transistor TFT and as a dielectric film in an area formed with a storage capacitance Cstg.

One of the pixel electrodes and the counter electrode may be made solid all over, and the other may be made of a plurality of strips. This type is known as the FFS type. Greater detail of the FFS type is contained in Lee et al., "A novel wide-viewing-angle technology: ultra-trans view™," SID 99 DIGEST, pp.202–205. This literature is incorporated by reference herein for the purpose of disclosure.

In an area intended for forming the thin film transistor TFT, first a semiconductor film 16 is formed on the surface of the insulating film 15. The semiconductor film 16 is made of amorphous silicon, for example, and is superimposed on the gate signal line 2 in point in the vicinity of the drain signal line 3. With this arrangement, a portion of the gate signal line 2 in point serves as a gate electrode of the thin film transistor TFT also.

The drain signal lines 3 are also formed on the insulating film 15 such that they extend in the y-axis direction and are arranged in the x-axis direction.

The drain signal lines 3 are provided with a drain electrode 3A integrally formed with the drain signal lines 3 such that the drain electrode 3A projects on a portion of the surface of the semiconductor layer 16 of the thin film transistor TFT.

Further, the pixel electrode 18 is formed on the surface of the insulating film 15 in the pixel area. The pixel electrode 18 is formed to run between the counter electrodes 14. One end of the pixel electrode 18 serves as a source electrode 18A of the thin film transistor TFT also, and the pixel electrode 18 then extends from the source electrode 18A to the midpoint of the pixel area in the positive x-axis direction, then bends in the negative y-axis direction and crosses the counter-voltage signal line 4 and further extends such that a portion of the other end of the pixel electrode 18 overlies the succeeding gate signal line 2.

If the number of the counter electrodes 14 in one pixel area is three or more, the number of the pixel electrodes 18 formed to run between two adjacent counter electrodes 14 may be increased to two or more.

The pixel electrode 18 is configured such that it generates electric fields (the strength of which corresponds to a video signal) having components parallel with the major surface of the transparent substrate 1A, between the pixel electrode 18 and the counter electrodes 14 adjacent thereto in the x-axis direction.

The pixel electrode 18 follows a zigzag path, and each of the counter electrodes 14 adjacent to the pixel electrode 18 is formed with zigzag sides facing a corresponding side of the pixel electrode 18 so that a distance between the facing sides of the pixel electrode 18 and the counter electrodes 14 is made constant.

The reason for this configuration is that two regions generating electric fields different from each other in direction, between the pixel electrode 18 and the counter electrodes 14 are formed so that color difference is prevented from appearing when a displayed image is viewed from different directions. This configuration is of the so-called multidomain type.

Greater detail of the multidomain type is contained in U.S. Pat. No. 5,745,207 issued on Apr. 28, 1998. This patent is incorporated by reference herein for the purpose of disclosure.

In this embodiment, the patterns of the counter electrodes 14 including the counter-voltage signal line 4 and the pixel electrode 18 have the following two special features:

(1) a capacitance formed between the counter electrodes 14 and the gate signal line 2 in point is made approximately equal to a capacitance formed between the counter electrode 14 and the succeeding gate signal line 2, and (2) a capacitance formed between the pixel electrode 18 and the gate signal line 2 in point is made approximately equal to a capacitance formed between the pixel electrode 18 and the succeeding gate signal line 2.

The counter-voltage signal line 4 extends in the center of the pixel area in the x-axis direction of FIG. 3, and the counter electrodes 14 connected to the counter-voltage signal line 4 are approximately vertically symmetrical with respect to the center of the counter-voltage signal line 4.

In the configuration of the pixel electrode 18, one end of the pixel electrode 18 is connected to the source electrode 18A of the thin film transistor TFT and has to make a detour before it connects with the major part of the pixel electrode 18, and therefore a portion of the other end of the pixel electrode 18 overlies the succeeding gate signal line 2 such that the capacitance formed between the pixel electrode 18 and the gate signal line 2 in point is made approximately equal to the capacitance formed between the pixel electrode 18 and the succeeding gate signal line 2.

Advantages of this configuration will be described in detail subsequently.

A portion of the pixel electrode 18 overlying the counter-voltage signal line 4 forms a capacitance Cstg having the insulating film 15 serving as an dielectric film between the pixel electrode 18 and the counter-voltage signal line 4. The capacitance Cstg provides an effect of storing video information in the pixel electrode 18 for a long period of time after the thin film transistor TFT is turned OFF.

The surfaces of two regions of the semiconductor layer 16 corresponding to interfaces between the drain electrode 3A and the semiconductor layer 16 and between the source electrode 18A and the semiconductor layer 16, of the thin film transistor TFT are doped with phosphorus (P) to form heavily doped layers and thereby provide ohmic contacts at the drain electrode 3A and the source electrode 18A. In the doping operation, first the entire surface of the semiconductor layer 16 is heavily doped, then the drain electrode 3A and the source electrode 18A are formed on the heavily doped layer, and then the heavily doped layer except the regions having the electrodes thereon is removed by etching using the electrodes as masks.

The insulating film 15 having formed thereon the thin film transistors TFT, the drain signal lines 3, the pixel electrodes 18 and the storage capacitance Cstg is covered with a protective film 19 made of silicon nitride, for example, as shown in FIG. 4.

Equivalent Circuit of a Pixel

Figure 1:
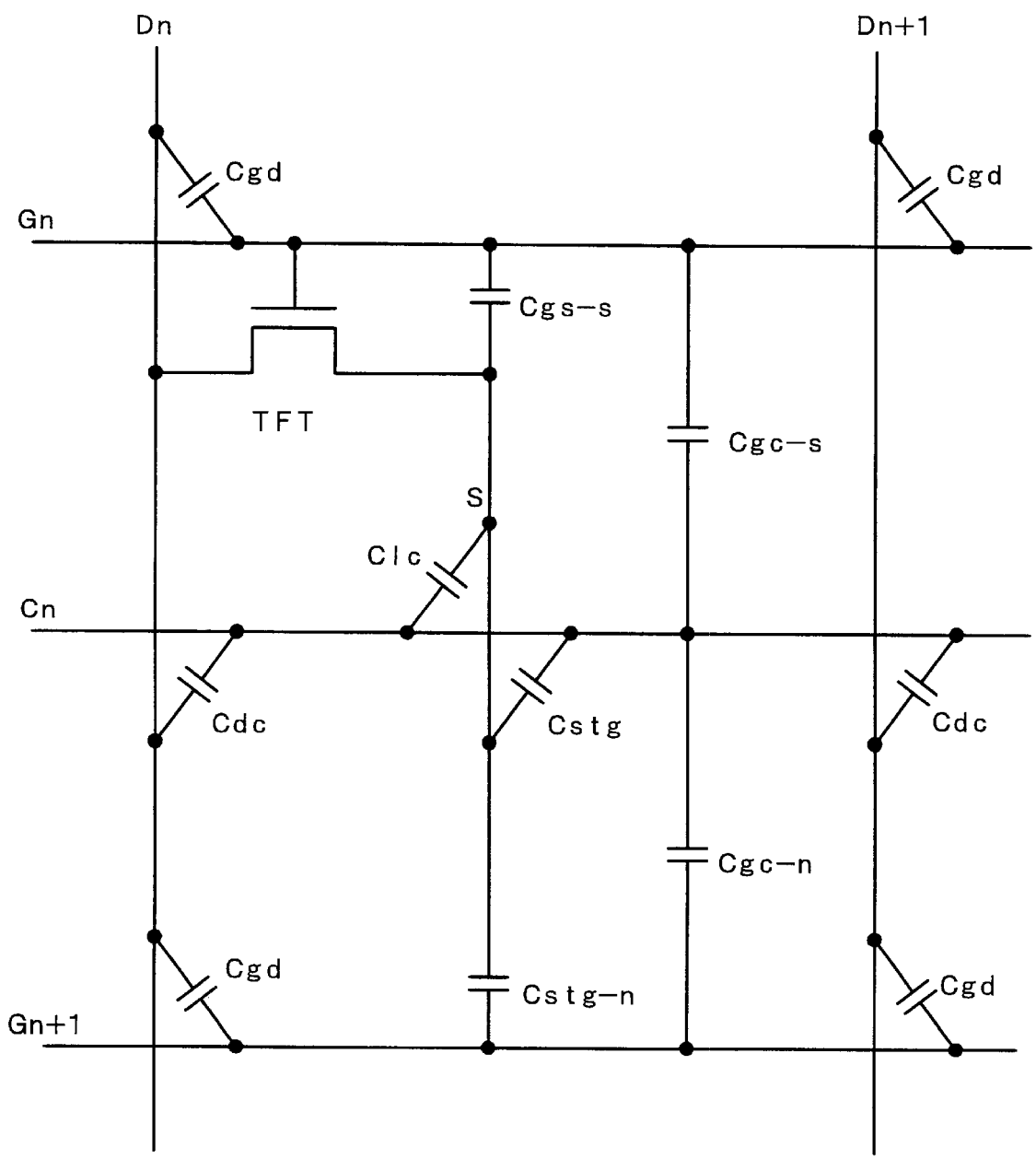
FIG. 1 is an equivalent circuit diagram of a pixel in an embodiment of a liquid crystal display device in accordance with the present invention.

FIG. 1 shows an equivalent circuit illustrated in geometrical conformity with the configuration shown in FIG. 3.

A gate signal line Gn in point and a succeeding gate signal line Gn+1 extend in the x-axis direction, and a counter-voltage signal line Cn extends in the x-axis direction between the gate signal lines Gn and Gn+1. The counter-voltage signal line Cn is intended to include the counter electrode. Drain signal lines Dn and Dn+1 extend in the y-axis direction.

An area surrounded by the gate signal lines Gn, Gn+1 and the drain signal lines Dn, Dn+1 forms a pixel area, and a pixel electrode S is disposed within the pixel area.

A thin film transistor TFT is driven by a scanning signal supplied from the gate signal line Gn, and video information from the drain signal line Dn is supplied to the pixel electrode S via the thin film transistor TFT.

The holding capacitance Cstg and the liquid crystal capacitance Clc are formed at an intersection of the pixel electrode S and the counter-voltage signal line Cn, and the intersections of the drain signal lines Dn, Dn+1 with the gate lines Gn, Gn+1 and the counter-voltage signal line Cn form intersection capacitances Cgd, Cgd and Cdc.

A capacitance Cgs–s is formed between the pixel electrode S and the gate signal line Gn in point, a capacitance Cgs–n is formed between the pixel electrode S and the succeeding gate signal line Gn+1, and in this embodiment the following relationship is satisfied:

the capacitance $Cgs-s \approx$ the capacitance $Cgs-n$.

Further, a capacitance Cgc–s is formed between the counter-voltage signal line Cn (which includes the counter electrode) and the gate signal line Gn in point, and a capacitance Cgc–n is formed between the counter-voltage signal line Cn and the succeeding gate signal line Gn+1, and in this embodiment the following relationship is satisfied:

the capacitance $Cgc-s \approx Cgc-n$.

Operation of the Circuit

Figure 5:
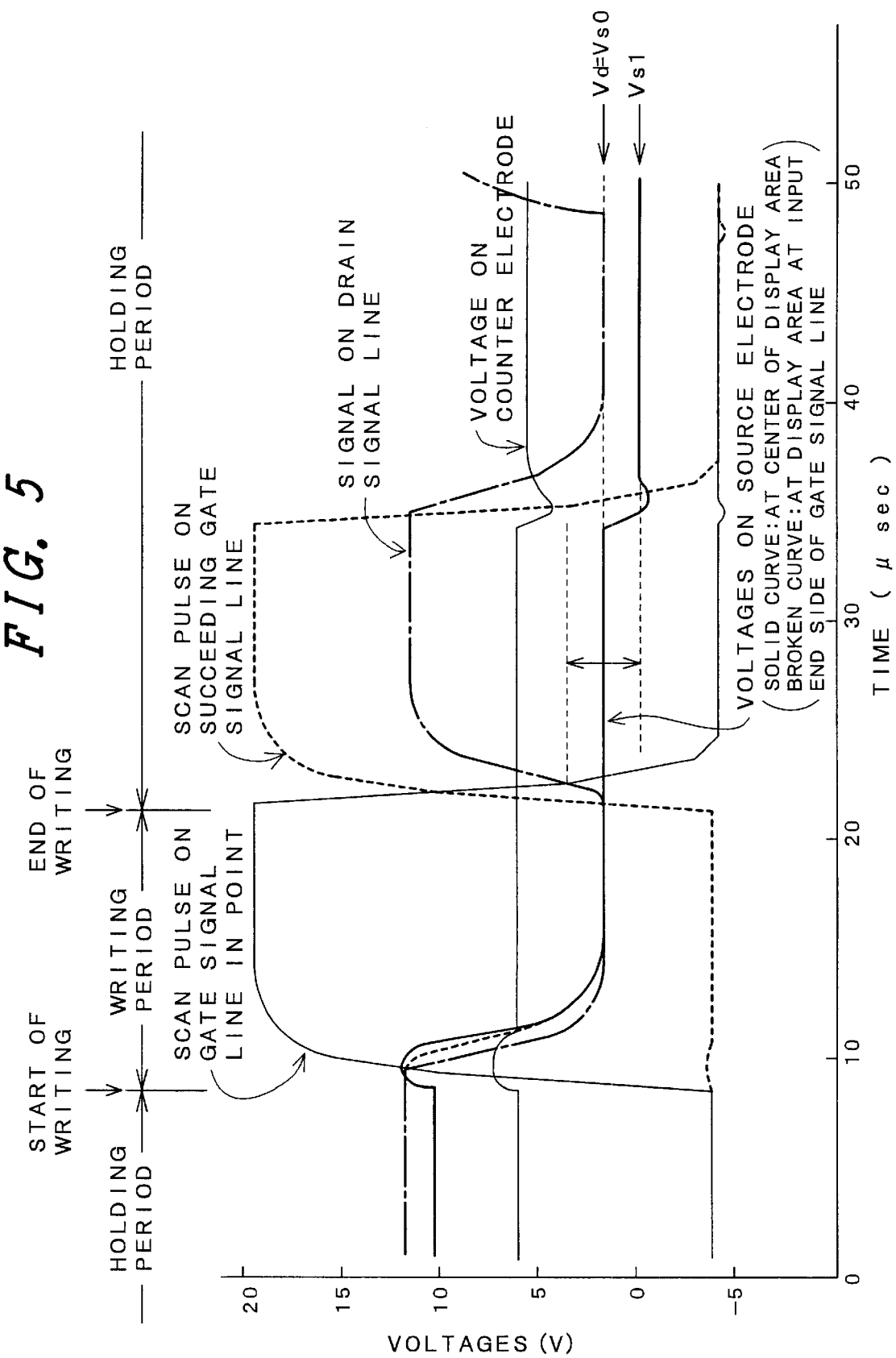
FIG. 5 illustrates operation of a circuit at an example of a pixel in a liquid crystal display device in accordance with the present invention.

FIG. 5 illustrates the operation of the circuit at the pixel shown in FIGS. 1 and 3.

Each pixel is provided with a writing time for writing video information thereinto and a time for holing the video information after the writing time, and during the writing time video information from the drain signal line Dn is supplied to the pixel electrode S via the thin film transistor TFT.

The thin film transistor TFT is turned ON by supplying a scanning signal to the gate signal line Gn in point, and the source electrode 18A (and thus the pixel electrode 18) has applied as a source voltage a drain voltage applied to the drain electrode 3A during the time when the scanning signal is supplied.

In the prior art, the source voltage was shifted toward a lower voltage by a disturbance voltage from the gate electrode via a capacitive coupling by a capacitance Cgs between the gate and the source of the thin film transistor TFT when a scanning signal on the gate signal line Gn in point falls (when writing of a signal is completed), but this embodiment is capable of reducing this shift to nearly zero.

As described above, in this embodiment, the capacitance Cgs–n between the succeeding gate signal line Gn+1 and the pixel electrode S (and thus the source electrode 18A) is made approximately equal to the capacitance Cgs–s between the gate signal line Gn in point and the pixel electrode S (and thus the source electrode 18A), and simultaneously with fall of the scanning signal applied to the gate signal line Gn in point, the scanning signal applied to the succeeding gate signal line Gn+1 rises. Consequently, the disturbance voltages caused by two gate pulses applied to the gate signal lines Gn, Gn+1 cancel each other.

Further, in the prior art, at the time when the scanning signal applied to the gate signal line Gn in point falls, that is, when writing of information is completed, the potential of the counter electrode is also shifted toward a lower potential due to a capacitive coupling by the capacitance Cgc–s between the counter electrode and the gate signal line Gn in point, and as a result, if a delay time constant of the counter-voltage signal is large, the potential of the counter electrode is shifted toward a lower potential by a disturbance voltage from the gate signal line Gn and varies the potential of the pixel electrode S via the holding capacitance Cstg. This embodiment, however, is capable of reducing this variation to nearly zero.

As described above, in this embodiment, the capacitance Cgc–n between the succeeding gate signal line Gn+1 and the counter electrode is made approximately equal to the capacitance Cgc–s between the gate signal line Gn in point and the counter electrode, and simultaneously with fall of the scanning signal applied to the gate signal line Gn in point, the scanning signal applied to the succeeding gate signal line Gn+1 rises. Consequently, the disturbance voltages caused on the counter electrode by two gate pulses applied to the gate signal lines Gn, Gn+1 cancel each other.

Incidentally, although the potential of the pixel electrode S (and thus the potential of the source electrode) is shifted toward a lower potential when the scanning signal applied to the succeeding gate signal line Gn+1 falls, at this time the thin film transistor TFT driven by the gate signal line Gn in point is in the completely OFF state such that so-called rewriting does not occur.

Figure 6:
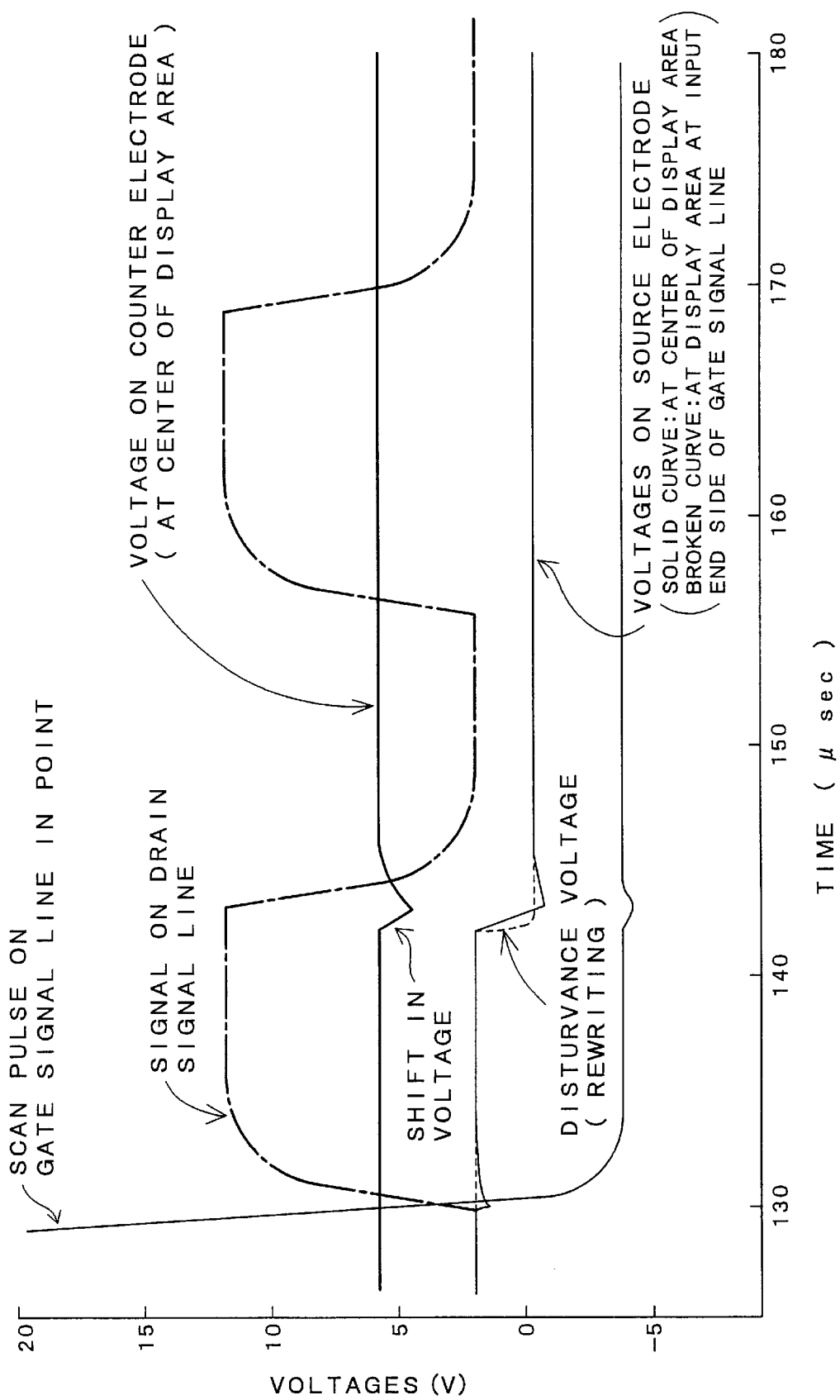
FIG. 6 illustrates operation of a circuit at an example of a pixel in a liquid crystal display device in accordance with the present invention.
Figure 7:
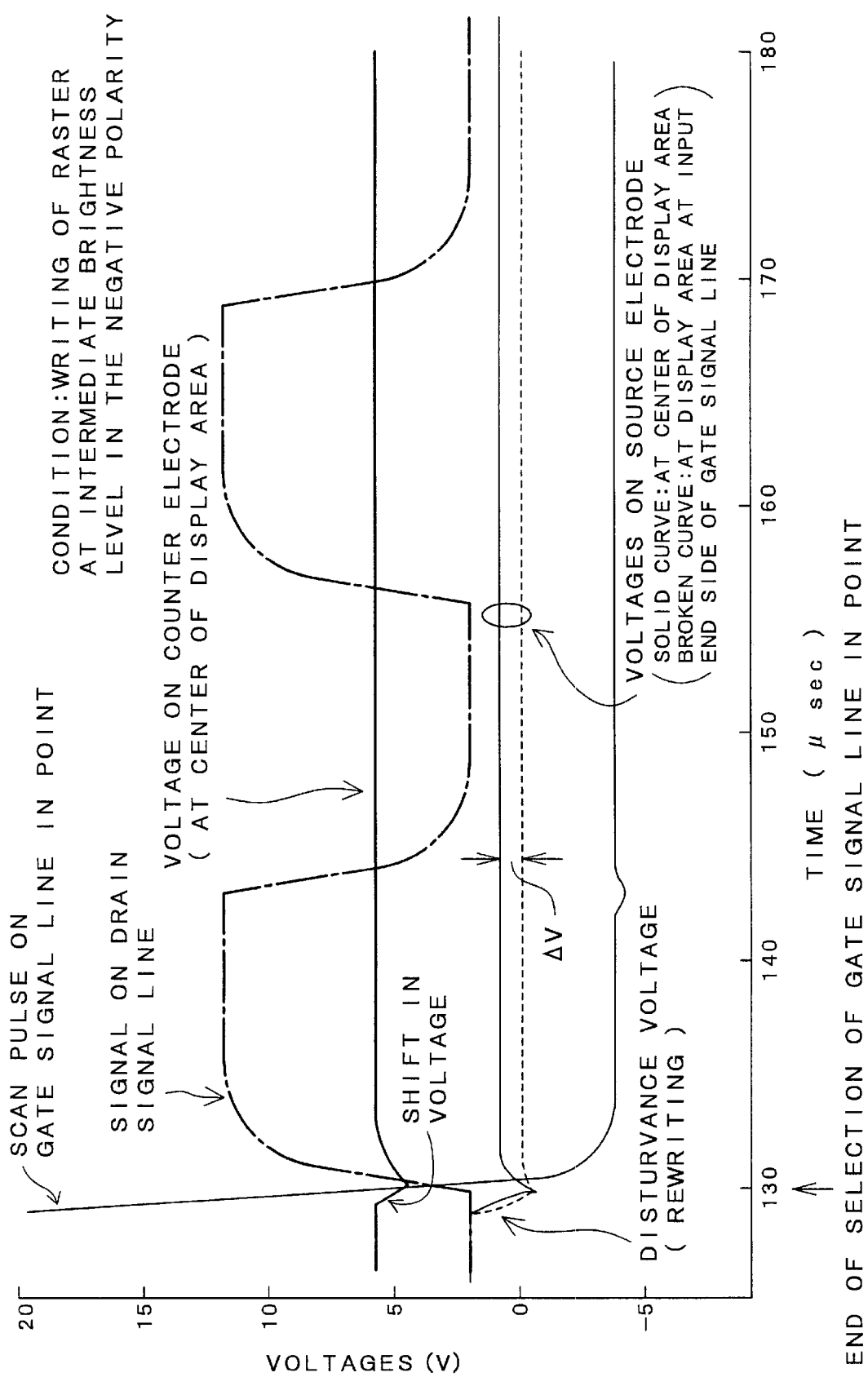
FIG. 7 is similar to FIG. 6, and illustrates operation of a circuit at a pixel in a prior art liquid crystal display device.

FIG. 6 shows waveforms of the potentials of the counter electrode and the source electrode after fall of the scanning signal applied to the gate signal line Gn in point, that is, after selection of the gate electrode in point is completed, and FIG. 7 shows those waveforms corresponding to the prior art device.

As is apparent from FIG. 7, a variation ΔV is caused in the potential of the source electrode in the prior art device and this caused variations in brightness of a displayed image.

In the above embodiment, the capacitance Cgs–s between the gate signal line Gn in point and the pixel electrode S is made approximately equal to the capacitance Cgs–n between the succeeding gate signal line Gn+1 and the pixel electrode S, and at the same time, the capacitance Cgc–s between the gate signal line Gn in point and the counter electrode is made approximately equal to the capacitance Cgc–n between the succeeding gate signal line Gn+1 and the counter electrode.

But it is not always necessary that the above two relationships are exactly satisfied, but the present inventors have confirmed it is sufficient for ensuring sufficient compensating effects that the capacitances Cgs–s and Cgc–s have some specified relationships with the capacitances Cgs–n and Cgc–n, respectively.

As shown in FIG. 5, a sufficient condition for achieving the object of the present invention is that a variation in the potential of the source electrode between a time when the gate signal line in point is selected and a time when the succeeding gate signal line is selected is made smaller than a variation in the potential of the source electrode between the time when the gate signal line in point is selected and a time when selection of the succeeding gate signal line has ended (a range indicated by a double-headed arrow in FIG. 5).

Figure 8:
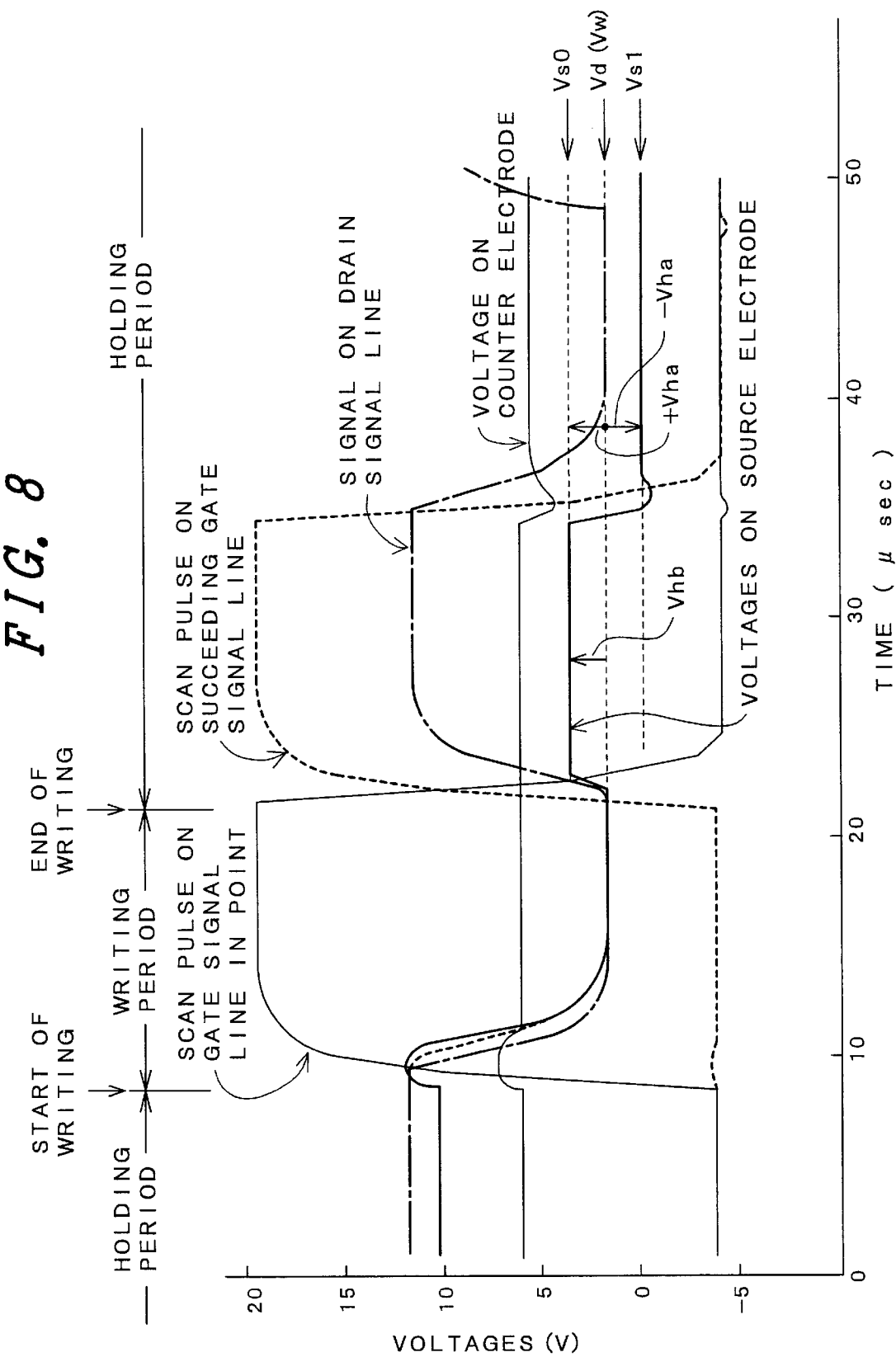
FIG. 8 illustrates operation of a circuit at a pixel in a liquid crystal display device in accordance with the present invention and represents a range for ensuring compensating effects.

In other words, as shown in FIG. 8, it is sufficient that the following relationship (1) is satisfied:

$$|Vhb| \leq |Vha| \tag{1}$$

where

Vw is a voltage for writing a video signal into the pixel electrode when a scanning signal is applied to the gate signal line in point, Vh1 is a hold voltage held on the pixel electrode during a time when the scanning signal is applied to the succeeding gate signal line, Vh2 is a hold voltage held on the pixel electrode after application of the scanning signal to the succeeding gate signal line has been completed,

|Vhb| is an absolute difference between Vw and Vh1, and

|Vha| is an absolute difference between Vw and Vh2.

For ensuring the above relationship, it was confirmed that it is sufficient that the following relationships (2) and (3) are satisfied:

$$(½)Cgs\text{–}s \leq Cgs\text{–}n \leq 2Cgs\text{–}s \tag{2}$$

$$(½)Cgc\text{–}s \leq Cgc\text{–}n \leq 2Cgc\text{–}s \tag{3},$$

where

Cgs–s is a capacitance between the pixel electrode and the gate signal line in point, Cgs–n is a capacitance between the pixel electrode and the succeeding gate signal line, Cgc–s is a capacitance between the counter electrode and the gate signal line in point, and Cgc–n is a capacitance between the counter electrode and the succeeding gate signal line.

Embodiment 2

Figure 9:
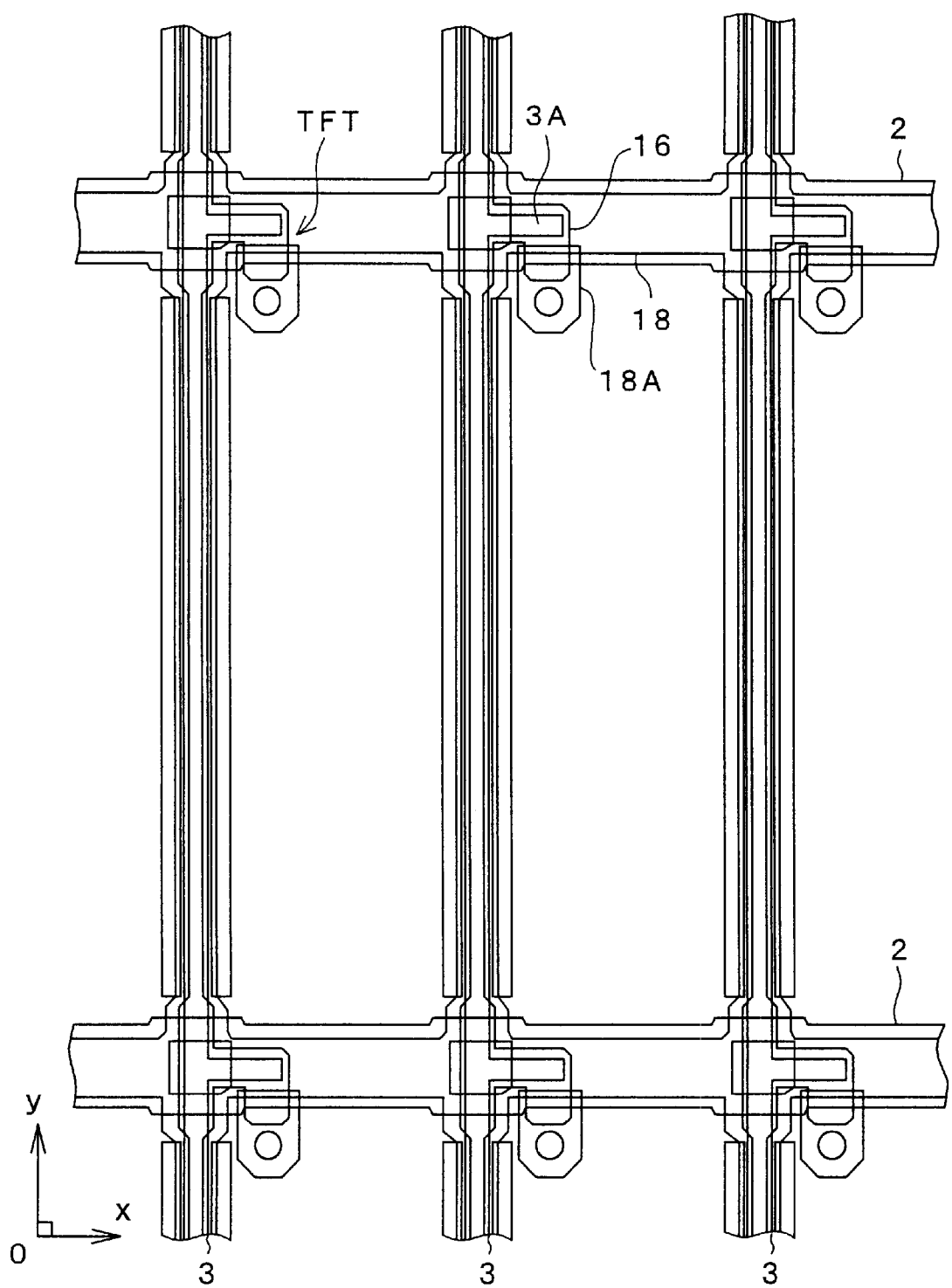
FIG. 9 is a plan view of an example of a pixel in an embodiment of a liquid crystal display device in accordance with the present invention.

FIG. 9 is a plan view of pixels of another embodiment of the present invention applied to a liquid crystal display device of the so-called vertical electric field type (the twisted nematic type, for example).

In FIG. 9, a pair of opposing transparent substrates (only one of which is shown) sandwich a liquid crystal layer (not shown) therebetween, and there are plural gate signal lines 2 each extending in the x-axis direction and arranged in the y-axis direction on a surface of one of the transparent substrates on a liquid crystal layer side thereof.

In FIG. 9, upper and lower ones of the gate signal lines 2 serve as the gate signal line in point and the succeeding gate signal line, respectively.

An insulating film (not shown) is formed on a surface of the transparent substrate including the gate signal lines 2. A semiconductor layer 16 is formed on the top surface of the insulating film to overlie a portion of each of the gate signal lines 2.

A drain electrode and a source electrode are formed on the top surface of the semiconductor layer 16 so as to form an MIS type thin film transistor TFT using a portion of the gate signal line 2 as a gate electrode and the insulating film as a gate insulating film.

The drain electrodes and the source electrodes are fabricated simultaneously with drain signal lines 3.

A plurality of drain signal lines 3 insulated from the gate signal lines 2 are formed to extend in the y-axis direction and be arranged in the x-axis direction. A portion of the drain signal line 3 extends to form the drain electrode 3A on the top surface of the semiconductor layer 16, and a source electrode 18A is disposed to oppose the drain electrode 3A.

The source electrode 18A is formed simultaneously with a contact portion extending from the source electrode 18A toward a pixel area for its connection with a pixel electrode described subsequently.

A protective film (not shown) is formed on the transparent substrate including the drain signal lines 3 and the thin film transistors TFT. The protective film is formed with a contact hole for exposing a portion of the contact portion extending the source electrode 18A.

A transparent electro-conductive pixel electrode 18 made of ITO (Indium Tin Oxide), for example, is formed on a top surface of the protective film in each pixel area (an area surrounded by two adjacent ones of the gate signal lines 2 and two adjacent ones of the drain signal lines 3).

The pixel electrode 18 is connected to the source electrode 18A of the thin film transistor TFT driven by the gate signal line in point, via the contact hole, and a portion of the periphery of the pixel electrode 18 is formed to overlie the succeeding gate signal line.

An overlap between the pixel electrode 18 and the succeeding gate signal line forms a capacitance element Cadd therebetween with the insulating film and the protective film therebetween used as a dielectric film.

The capacitance element Cadd stores video information (a video signal) supplied via the thin film transistor TFT on the pixel electrode 18 for a long period of time after the thin film transistor TFT is turned OFF.

The other of the two opposing transparent substrates has formed thereon a counter electrode (also called a common electrode) made of a transparent electro-conductive material to face all the pixel areas in common, and each of the pixel electrodes 18 generates an electric field in a liquid crystal layer sandwiched between the pixel electrode and the counter electrode so as to control light transmission through the liquid crystal layer.

In this configuration also, a capacitance Cgs between the pixel electrode and the gate signal line in point is made approximately equal to a capacitance Cadd between the pixel electrode and the succeeding gate signal line.

By satisfying the above relationship, as in the case described above, simultaneously with fall of the scanning signal applied to the gate signal line in point, the scanning signal applied to the succeeding gate signal line rises, and consequently, the disturbance voltages caused by two gate pulses applied to the gate signal line in point and the succeeding gate signal line, respectively, cancel each other.

But it is not always necessary that the capacitance Cgs between the pixel electrode and the gate signal line in point is made approximately equal to the capacitance Cadd between the pixel electrode and the succeeding gate signal line, and the present inventors have confirmed it is sufficient for ensuring sufficient compensating effects that the following relationship (4) is satisfied:

$$(\tfrac{1}{2})Cgs \leq Cadd \leq 2Cgs \qquad (4)$$

Embodiment 3

Figure 10:
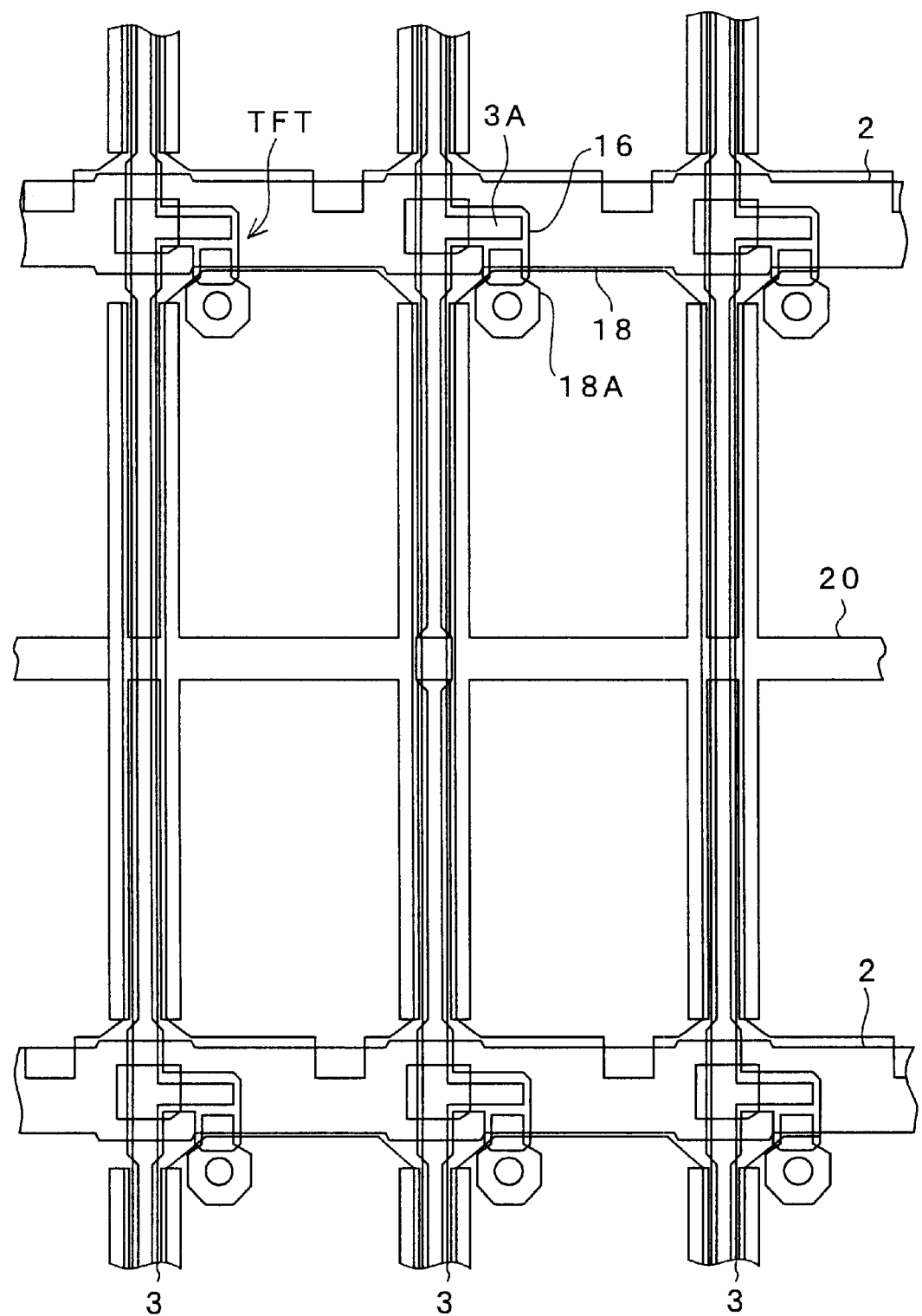
FIG. 10 is a plan view of an example of a pixel in an embodiment of a liquid crystal display device in accordance with the present invention.

FIG. 10 is a plan view of pixels of still another embodiment of the present invention applied to a liquid crystal display device of the so-called vertical electric field type as in the case of Embodiment 2.

The configuration of FIG. 10 differs from that of FIG. 9, in that, in FIG. 10, a storage line 20 (which may be fabricated simultaneously with the gate signal lines 2, for example) is disposed to extend in the x-axis direction in the center of the pixel area, and this storage line 20 forms a capacitance element Cstg between the storage line 20 and the pixel electrode 18.

In this case also, the same relationship as in Example 2 can be established between the capacitance Cgs between the pixel electrode and the gate signal line in point and the capacitance between the pixel electrode and the succeeding gate signal line.

Embodiment 4

This embodiment also applies the present invention to a liquid crystal display device of the in-plane switching type (the horizontal electric field type) as in the case of Embodiment 1.

First, the basic structure of this embodiment will be explained by referring to FIG. 11 which is a plan view of a unit pixel and its vicinity without the present invention being applied thereto. The structure of FIG. 11 differs from that of FIG. 3, in that, while in FIG. 3, two adjacent counter electrodes 14 are electrically connected together by one counter-voltage signal line 4 extending horizontally in the center of the pixel, the two adjacent counter electrodes 14 are electrically connected together by a pair of counter-voltage signal lines 400 extending horizontally at the top and the bottom of the pixel in FIG. 11.

Figure 11:
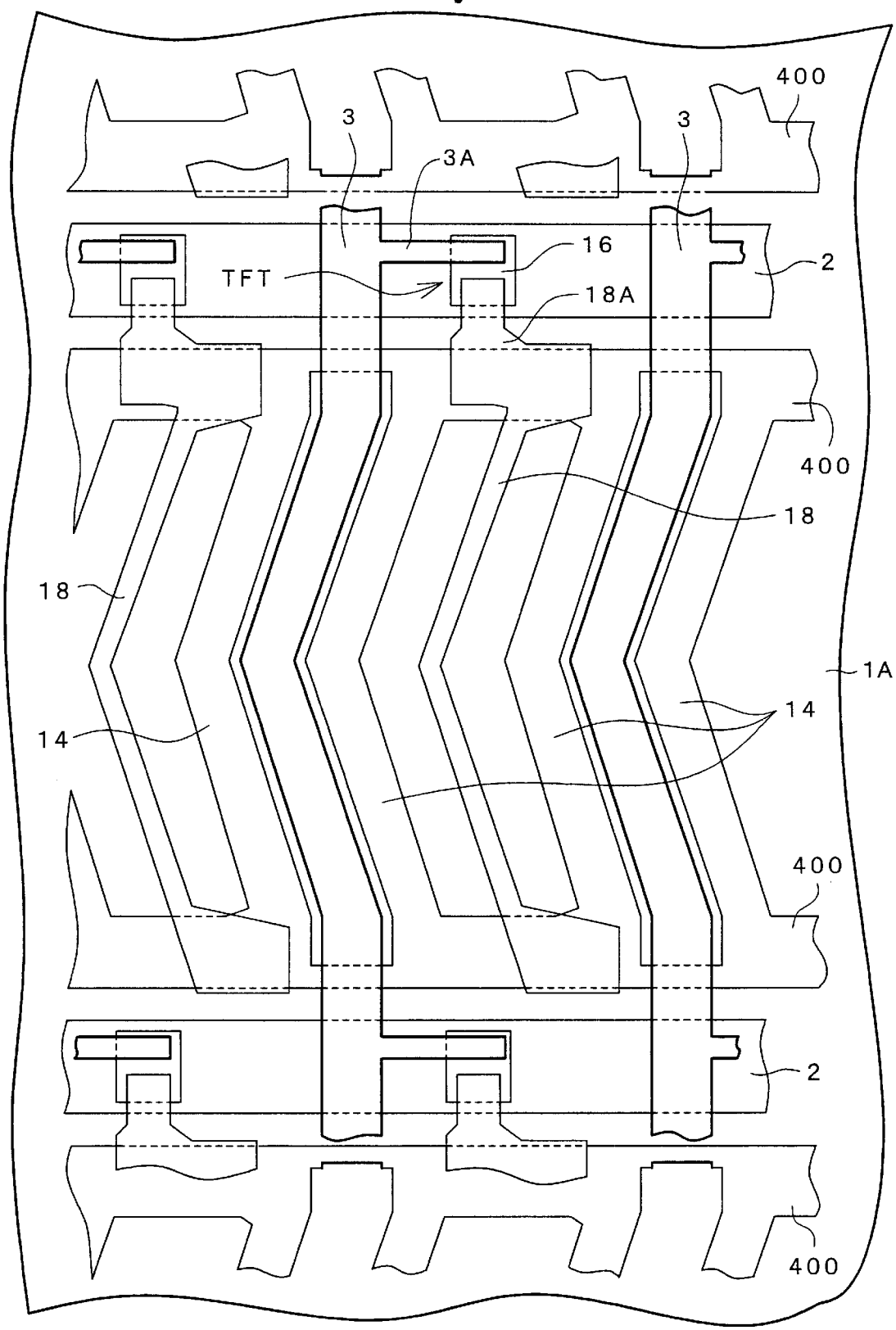
FIG. 11 is a plan view illustrating a basic structure of an example of a pixel in an embodiment of a liquid crystal display device in accordance with the present invention.

The structure of FIG. 11 provides the following advantages:
(i) a redundant structure against opens of the counter-voltage signal lines,
(ii) a redundant structure against opens of the counter electrodes and reduction of resistance of leads for applying a voltage to the counter electrodes, provided by the structure such that each counter electrode is supplied with the voltage at both top and bottom thereof, and
(iii) improvement of quality of a displayed image due to shielding by the counter-voltage signal lines such that leakage electric fields from the gate signal lines are prevented from penetrating into the interior of the pixel.

Next, the configuration of this embodiment in which the present invention is applied to the structure of FIG. 11 will be explained by referring to FIG. 12 which is a plan view of a unit pixel and its vicinity in this embodiment.

Figure 12:
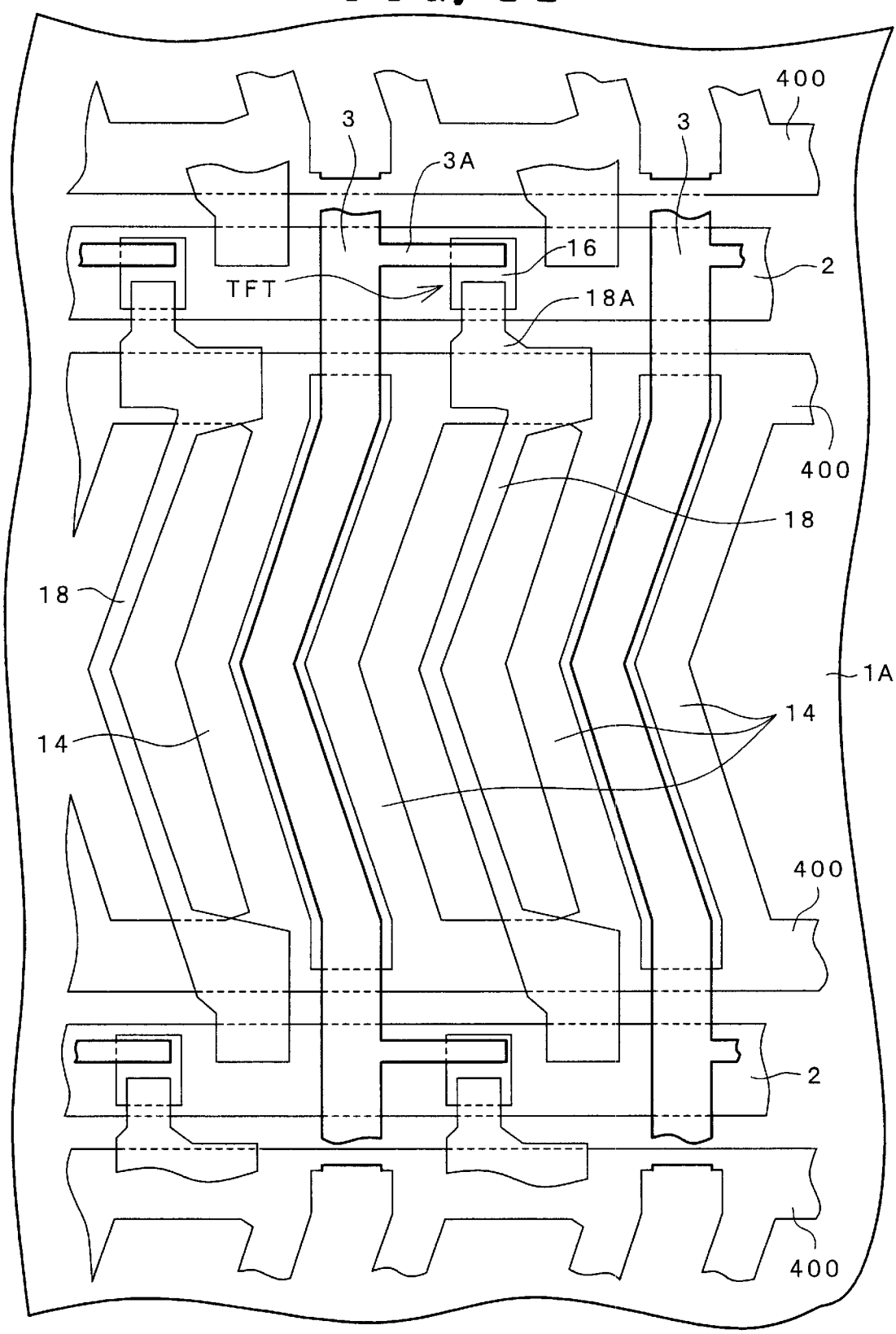
FIG. 12 is a plan view of an example of a pixel in an embodiment of a liquid crystal display device in accordance with the present invention.

In FIG. 12, the pixel electrode 18 is formed on the surface of the insulating film (not shown) to run between the counter electrodes 14 in the pixel area. The pixel electrode 18 begins from one end thereof which also serves as a source electrode 18A of the thin film transistor TFT, then crosses one counter-voltage signal line 400 extending horizontally at the top of the pixel area, then run between the counter electrodes 14, then crosses another counter-voltage signal line 400 extending horizontally at the bottom of the pixel area, and further extends such that a portion of the other end of the pixel electrode 18 overlies the succeeding gate signal line 2.

In this embodiment also, the patterns of the counter electrodes 14 including the counter-voltage signal lines 400 and the pixel electrode 18 have the following two features as in the case of Embodiment 1:
(1) a capacitance formed between the counter electrodes 14 and the gate signal line 2 in point is made approximately equal to a capacitance formed between the counter electrode 14 and the succeeding gate signal line 2, and (2) a capacitance formed between the pixel electrode 18 and the gate signal line 2 in point is made approximately equal to a capacitance formed between the pixel electrode 18 and the succeeding gate signal line 2.

The present embodiments also provides the advantages obtained in Embodiment 1. The inequalities (1)–(4) described in connection with Embodiment 1 are also applicable to this embodiment.

In the embodiment of FIG. 12, the pixel electrode 18 is provided with one bend, but the present invention is not limited to this configuration, and the number of bends can be increased to more than one, and it is preferable that the number of the bends is odd. If the number of bends is even, the end of the pixel electrode 18 on the succeeding gate signal line side becomes close to another thin film transistor TFT corresponding to the succeeding gate signal line, this increases possibility of a short-circuit between the end of the pixel electrode 18 and a drain electrode of the thin film transistor TFT, and consequently decreases the yield rate of the liquid crystal display device. Further, a capacitance Cds formed between the drain signal line and the pixel electrode is increased and as a result, quality of a displayed image is degraded.

Bending of the drain signal line 3 in conformity with the bend of the pixel electrode 18 as shown in FIG. 12 reduces fluctuations of a capacitance Cds formed between the drain signal line 3 and the pixel electrode 18, and consequently, this reduction of the fluctuations of the capacitance Cds suppresses degradation of the improvement of quality of a displayed image obtained by making the capacitance Cgs–s between the pixel electrode 18 and the corresponding gate signal line 2 close to the capacitance Cgs–n between the pixel electrode 18 and the succeeding gate signal line 2.

Embodiment 5

In FIG. 12, by satisfying the following inequalities, the compatibility of sufficient holding of video signals and compensation of the graded brightness distribution in a displayed image is secured.

$$(\tfrac{1}{2})Cgs-s \leq Cgs-n \leq 2Cgs-s,$$

$$Cadd \leq Cstg1,$$

and $$Cadd < Cstg2,$$

where

Cgs–s is a capacitance between the pixel electrode 18 and the corresponding gate signal line 2, Cgs–n is a capacitance between the pixel electrode 18 and the succeeding gate signal line 2, Cstg1 is a capacitance between the pixel electrode 18 and the counter-voltage signal line 400 at the top of the pixel, Cstg2 is a capacitance between the pixel electrode 18 and the counter-voltage signal line 400 at the bottom of the pixel, and Cadd is a capacitance between the pixel electrode 18 and the succeeding gate signal line 2.

Embodiment 6

In Embodiment 5, the capacitance Cstg2 is formed close to a thin film transistor TFT corresponding to the succeeding gate signal line 2. There is a possibility of reducing a yield rate of the liquid crystal display device due to an increase in possibility of a short-circuit between the pixel electrode 18 and a drain electrode of the thin film transistor TFT, and further there is a possibility of deteriorating the quality of a displayed image due to an increase in the capacitance Cds between the drain signal line 3 and the pixel electrode 18. These problems are reduced or eliminated by satisfying the following inequality:

$$Cstg1 > Cstg2.$$

Embodiment 7

The advantages similar to those of the present invention obtained by the above embodiments are obtained by satisfying the following condition in FIGS. 3, 9, 10, 11 and 12:

$$(\tfrac{1}{2}) \text{Area } A < \text{Area } C < 2 \text{ Area } A,$$

where

Area A is an area of a region A of the gate signal line 2 being overlaid with the source electrode 18A, Area B is an area of a region B of the gate signal line 2 being overlaid with the drain electrode 3A, and Area C is an area of a region C of the gate signal lines being overlaid with a pixel electrode corresponding to a preceding gate signal line 2, the region A, the region B and the region C being spaced from one another.

Suppose the thin film transistor TFT is ON and therefore its semiconductor layer is conducting, then the ratio in capacitance among the regions A, B and C is approximately equal to that in area among the regions A, B and C.

As is apparent from the above explanation, the present invention is capable of stabilizing potentials of the pixel electrodes irrespective of the amount of signal delays in lines such as gate signal lines.

What is claimed is:

1. A liquid crystal display device comprising:

a pair of opposing substrates;

a liquid crystal layer sandwiched between said pair of opposing substrates;

a plurality of gate signal lines disposed on a liquid crystal layer side surface of one of said pair of opposing substrates;

a plurality of drain signal lines disposed to intersect said plurality of gate signal lines with an insulating layer interposed therebetween; and a plurality of pixel areas each having a pixel electrode, a counter electrode adjacent to said pixel electrode and a switching element, and surrounded by two adjacent ones of said plurality of gate signal lines and two adjacent ones of said plurality of drain signal lines, said pixel electrode and said counter electrode being arranged so as to generate therebetween an electric field having a component parallel to said surface of said one of said pair of opposing substrates, said pixel electrode being supplied with a video signal from a corresponding one of said plurality of drain signal lines via said switching element driven by a scanning signal supplied from a corresponding one of said plurality of gate signal lines, wherein a capacitance formed between said pixel electrode and said corresponding one of said plurality of gate signal lines is approximately equal to a capacitance formed between said pixel electrode and one of said plurality of gate signal lines succeeding said corresponding one of said plurality of gate signal lines, and a capacitance formed between said counter electrode and said corresponding one of said plurality of gate signal lines is approximately equal to a capacitance formed between said counter electrode and one of said plurality of gate signal lines succeeding said corresponding one of said plurality of gate signal lines.

2. A liquid crystal display device according to claim 1, wherein a scanning signal supplied to said one of said plurality of gate signal lines succeeding said corresponding one of said plurality of gate signal lines rises simultaneously with fall of a scanning signal line supplied to said corresponding one of said plurality of gate signal lines.

3. A liquid crystal display device comprising:

a pair of opposing first and second substrates;

a liquid crystal layer sandwiched between said pair of opposing first and second substrates;

a plurality of gate signal lines disposed on a liquid crystal layer side surface of said first substrate;

a plurality of drain signal lines disposed to intersect said plurality of gate signal lines with an insulating layer interposed therebetween; and a plurality of pixel areas each having a pixel electrode, a counter electrode adjacent to said pixel electrode and a switching element, and arranged in a matrix fashion surrounded by two adjacent ones of said plurality of gate signal lines and two adjacent ones of said plurality of drain signal lines, said pixel electrode being supplied with a video signal from a corresponding one of said plurality of drain signal lines via said switching element driven by a scanning signal supplied from a corresponding one of said plurality of gate signal lines, said pixel electrode and said counter electrode being arranged so as to generate therebetween an electric field having a component parallel to said surface of said first substrate, wherein following inequalities are satisfied:

$$(\tfrac{1}{2})Cgs\text{-}s \leq Cgs\text{-}n \leq 2Cgs\text{-}s,$$

and $$(\tfrac{1}{2})Cgc\text{-}s \leq Cgc\text{-}n \leq 2Cgc\text{-}s,$$

where

Cgs–s is a capacitance formed between said pixel electrode and said corresponding one of said plurality of gate signal lines, Cgs–n is a capacitance formed between said pixel electrode and one of said plurality of gate signal lines succeeding said corresponding one of said plurality of gate signal lines, Cgc–s is a capacitance formed between said counter electrode and said corresponding one of said plurality of gate signal lines, and Cgc–n is a capacitance formed between said counter electrode and one of said plurality of gate signal lines succeeding said corresponding one of said plurality of gate signal lines.

4. A liquid crystal display device according to claim 3, wherein a scanning signal supplied to said one of said plurality of gate signal lines succeeding said corresponding one of said plurality of gate signal lines rises simultaneously with fall of a scanning signal line supplied to said corresponding one of said plurality of gate signal lines.

5. A liquid crystal display device comprising:

a pair of opposing substrates;

a liquid crystal layer sandwiched between said pair of opposing substrates;

a plurality of gate signal lines disposed on a liquid crystal layer side surface of one of said pair of opposing substrates;

a plurality of drain signal lines disposed to intersect said plurality of gate signal lines with an insulating layer interposed therebetween; and a plurality of pixel areas each having a pixel electrode and a switching element, and surrounded by two adjacent ones of said plurality of gate signal lines and two adjacent ones of said plurality of drain signal lines, said pixel electrode being configured so as to hold a video signal written thereinto from a corresponding one of said plurality of drain signal lines via said switching element driven by a scanning signal supplied from a corresponding one of said plurality of gate signal lines, wherein a following inequality is satisfied:

$$|Vhb| \leq |Vha|,$$

where

Vw is a voltage for writing said video signal into said pixel electrode when said scanning signal is applied to said corresponding one of said plurality of gate signal lines, Vh1 is a hold voltage held on said pixel electrode when a second scanning signal is applied to one of said plurality of gate signal lines succeeding said corresponding one of said plurality of gate signal lines, Vh2 is a hold voltage held on said pixel electrode after an end of said second scanning signal,

|Vhb| is an absolute difference between Vw and Vh1, and

|Vha| is an absolute difference between Vw and Vh2.

6. A liquid crystal display device comprising:

a pair of opposing substrates;

a liquid crystal layer sandwiched between said pair of opposing substrates;

a plurality of gate signal lines disposed on a liquid crystal layer side surface of one of said pair of opposing substrates;

a plurality of drain signal lines disposed to intersect said plurality of gate signal lines with an insulating layer interposed therebetween; and a plurality of pixel areas each having a pixel electrode and a thin film transistor, and surrounded by two adjacent ones of said plurality of gate signal lines and two adjacent ones of said plurality of drain signal lines, said pixel electrode being supplied with a voltage Vs of a source electrode of said thin film transistor receiving a drain electrode voltage Vd from a corresponding one of said plurality of drain signal lines, said thin film transistor being driven by rise of a signal supplied from a corresponding one of said plurality of gate signal lines, wherein Vso is in range of Vd±Vds, where Vso is a voltage of said source electrode during a rising period of a second signal on one of said plurality of gate signal lines succeeding said corresponding one of gate signal lines, and Vds is a difference between said drain electrode voltage Vd and a voltage Vs1 of said source electrode after said second signal is turned off.

7. A liquid crystal display device comprising:

a pair of opposing substrates;

a liquid crystal layer sandwiched between said pair of opposing substrates;

a plurality of gate signal lines disposed in a liquid crystal layer side surface of one of said pair of opposing substrates;

a plurality of drain signal lines disposed to intersect said plurality of gate signal lines with an insulating layer interposed therebetween;

a plurality of pixel areas each having a pixel electrode, a counter electrode adjacent to said pixel electrode and a switching element, and surrounded by two adjacent ones of said plurality of gate signal lines and two adjacent ones of said plurality of drain signal lines, said pixel electrode and said counter electrode being arranged so as to generate therebetween an electric field having a component parallel to said surface of said one of said pair of opposing substrates, said pixel electrode being supplied with a video signal from a corresponding one of said plurality of drain signal lines via said switching element driven by a scanning signal supplied from a corresponding one of said plurality of gate signal lines, a pair of first and second counter-voltage signal lines for applying a voltage to said counter electrode, wherein at least one of said pixel electrodes has a portion overlying one of said plurality of gate signal lines succeeding said corresponding one of said plurality of gate signal lines, and an insulating layer is interposed between said at least one of said pixel electrodes and said one of said plurality of gate signal lines at said portion, and said pair of first and second counter-voltage signal lines are connected to ends of said counter electrode, respectively, wherein said first counter-voltage signal line and said pixel electrode form a first holding capacitance Cstg1 therebetween, said second counter-voltage signal line and said pixel electrode form a second holding capacitance Cstg2 therebetween, and said pixel electrode and said second one of said plurality of gate signal lines form a capacitance Cadd therebetween, and wherein following inequalities are satisfied $(½)Cgs-s \leq Cgs-n \leq 2Cgs-s$, $Cadd<Cstg1$, and $Cadd<Cstg2$, where Cgs–s is a capacitance between said pixel electrode and said corresponding one of said plurality of gate signal lines, and Cgs–n is a capacitance between said pixel electrode and said second one of said plurality of gate signal lines.

8. A liquid crystal display device according to claim 7, wherein said first counter-voltage signal line is disposed adjacent to said corresponding one of said plurality of gate signal lines, said second counter-voltage signal line is disposed adjacent to said second one of said plurality of gate signal lines, and a following inequality is satisfied:

$Cstg1>Cstg2$.

9. A liquid crystal display device comprising:

a pair of opposing substrates;

a liquid crystal layer sandwiched between said pair of opposing substrates;

a plurality of scanning signal lines disposed on a liquid crystal layer side surface of one of said pair of opposing substrates;

a plurality of video signal lines disposed to intersect said plurality of scanning signal lines with an insulating layer interposed therebetween;

a plurality of pixel areas each having a pixel electrode and a thin film transistor, and surrounded by two adjacent ones of said plurality of scanning signal lines and two adjacent ones of said plurality of video signal lines, a source electrode of said thin film transistor being connected to a corresponding one of said plurality of video signal lines, a gate electrode of said thin film transistor being connected to a corresponding one of said plurality of scanning signal lines, and wherein a following inequality is satisfied $(½) \text{Area } A < \text{Area } C < 2 \text{ Area } A$, where said Area A is an area of a region A of said corresponding one of said plurality of scanning signal lines being overlaid with said source electrode, and said Area C is an area of a region C of said corresponding one of said plurality of scanning signal lines being overlaid with a pixel electrode corresponding to one of said plurality of scanning signal lines preceding said corresponding one of said plurality of scanning signal lines, said region A and said region C being spaced from one another.

10. A liquid crystal display device according to claim 9, wherein said source electrode, said drain electrode and pixel electrode are disposed on a same layer.

11. A liquid crystal display device according to claim 10, wherein a second scanning signal from one of said plurality of scanning signal lines succeeding said corresponding one of said plurality of scanning signal lines rises approximately simultaneously with fall of a first scanning signal on said corresponding one of said plurality of scanning signal lines such that disturbances introduced into said pixel electrode by said first scanning signal and said second scanning signal cancel each other.

* * * * *